(No Model.)  3 Sheets—Sheet 1.

W. MAIN.
ELECTRIC TELEPHONE.

No. 249,190.  Patented Nov. 8, 1881.

WITNESSES:
L. B. Bolton
Geo. Bainton.

INVENTOR:
Wm. Main

By his Attorneys,
Burke, Fraser & Connolly (No Model.) 3 Sheets—Sheet 2.
W. MAIN.
ELECTRIC TELEPHONE.
No. 249,190. Patented Nov. 8, 1881.
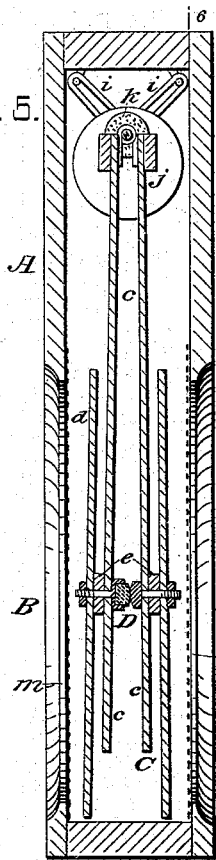
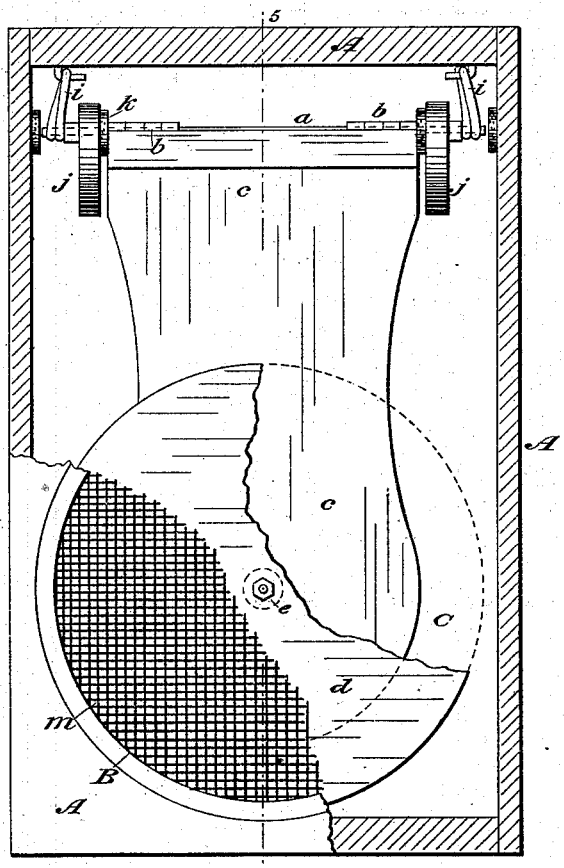
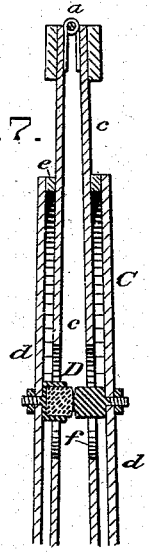
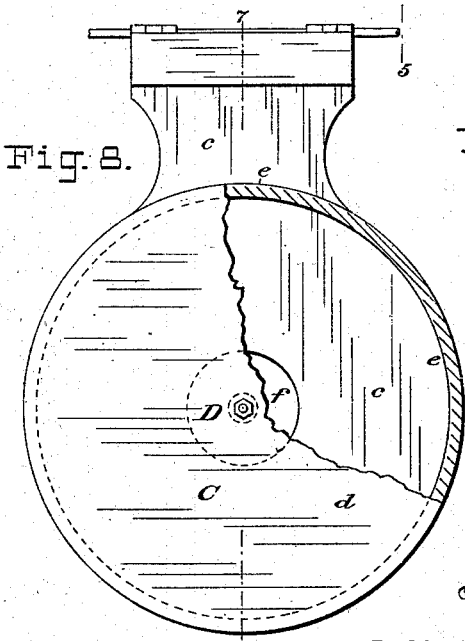
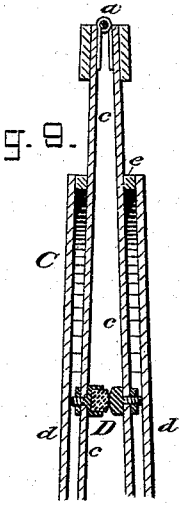
WITNESSES:
INVENTOR:

(No Model.) 3 Sheets—Sheet 3.
W. MAIN.
ELECTRIC TELEPHONE.
No. 249,190. Patented Nov. 8, 1881.
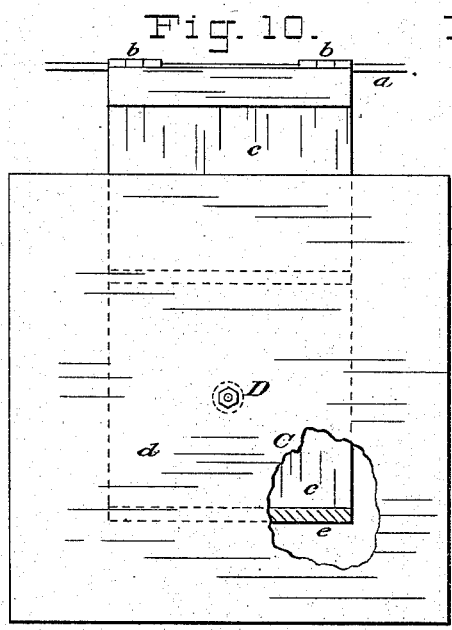 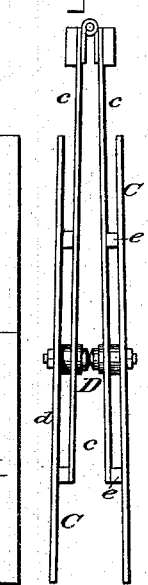 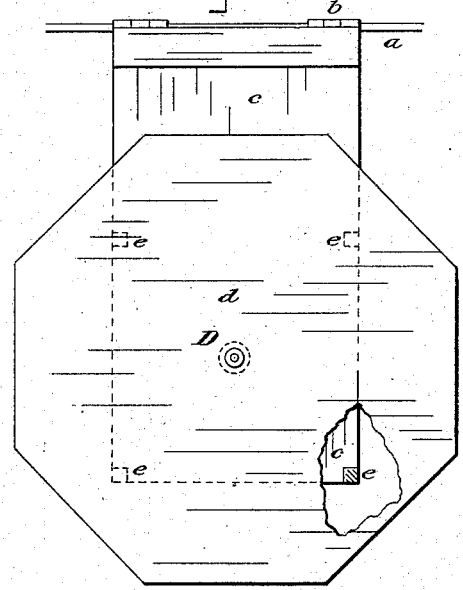
Fig. 10. Fig. 11. Fig. 12.
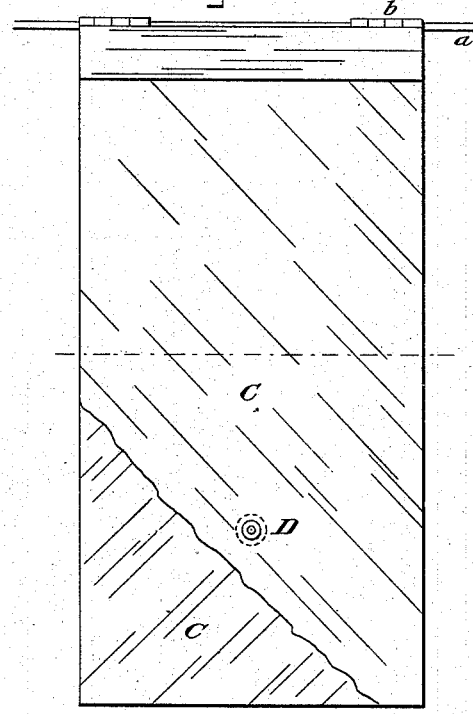  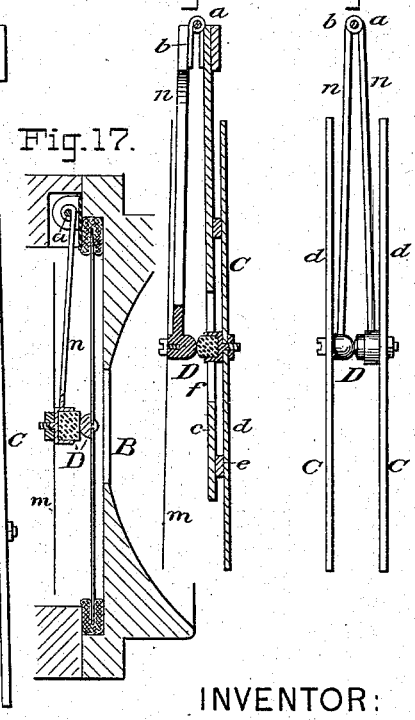
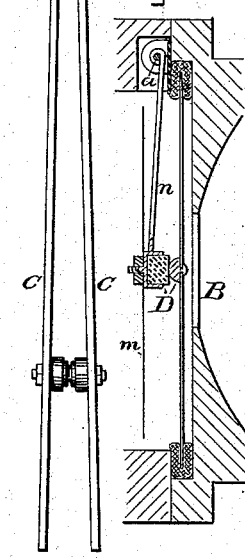
Fig. 13. Fig. 14. Fig. 15. Fig. 16. Fig. 17.
WITNESSES:
E. B. Bolton
Geo. Bainton
INVENTOR:
Wm. Main
By his Attorneys,
Burke, Fraser & Bennett

UNITED STATES PATENT OFFICE.

WILLIAM MAIN, OF BROOKLYN, NEW YORK.

ELECTRIC TELEPHONE.

SPECIFICATION forming part of Letters Patent No. 249,190, dated November 8, 1881.

Application filed April 16, 1881. (No model.)

*To all whom it may concern:*

Be it known that I, WILLIAM MAIN, a citizen of the United States, residing in the city of Brooklyn, in the county of Kings and State of New York, have invented certain Improvements in Electric Telephones, of which the following is a specification.

My present invention is an improvement on and development of the invention embodied in my application No. 23,412, which has, since the filing of my present application, gone to issue as Patent No. 244,638, dated July 19, 1881.

Figure 1:
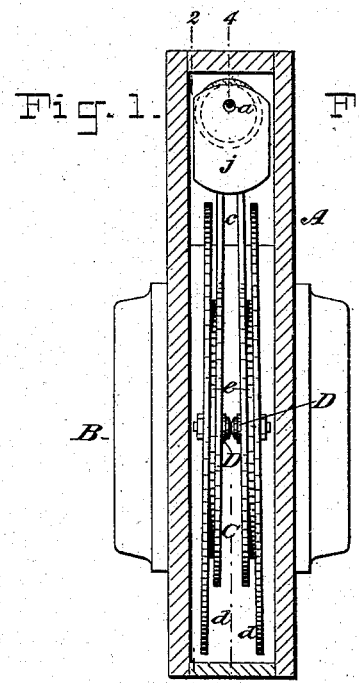
Figure 2:
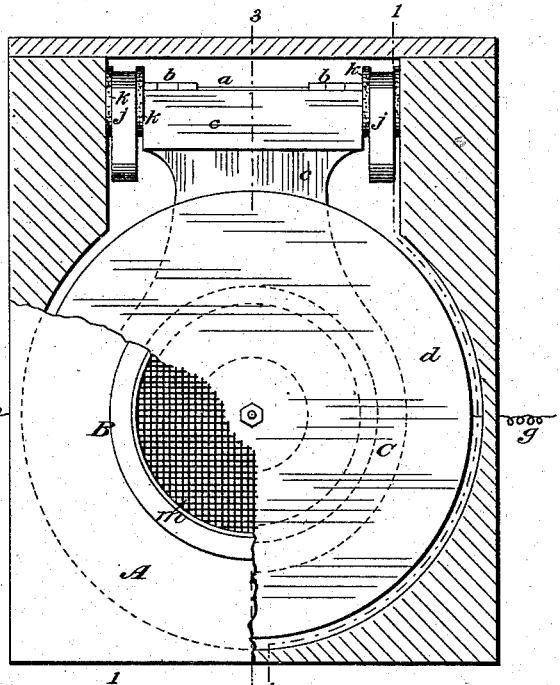
Figure 3:
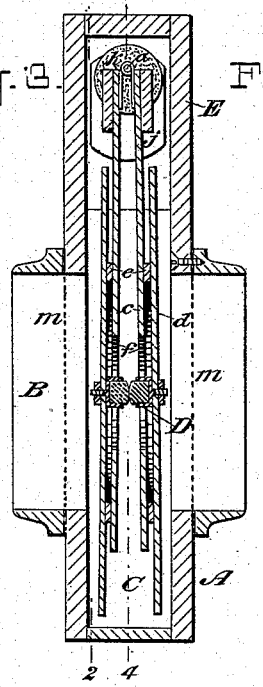
Figure 4:
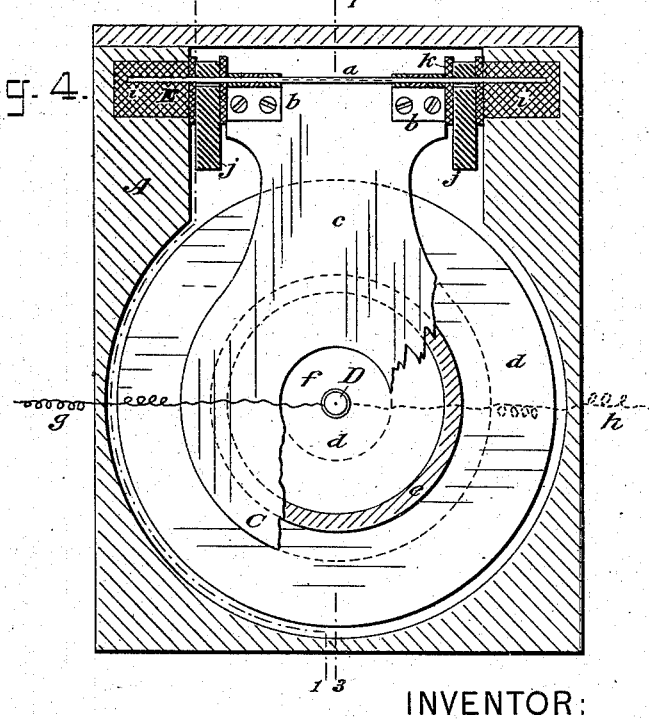

In the accompanying drawings, Figures 1 to 4 show the preferred form of my telephone and its case, and the remaining figures illustrate modifications. Fig. 1 is a vertical section of the inclosing-case, taken on the line 1 1 in Figs. 2 and 4, the remaining or active elements of the telephone being shown in side elevation. Fig. 2 is a front elevation of the telephone, the greater part of the case being in section cut on the line 2 2, in Figs. 1 and 3. Fig. 3 is a vertical transverse mid-section taken on the line 3 3 in Figs. 2 and 4, and Fig. 4 is a vertical mid-section taken in the plane of the line 4 4 in Figs. 1 and 3. Fig. 5 is a vertical transverse mid-section taken in the plane of the line 5 5 in Fig. 6. Fig. 6 is a front elevation of Fig. 5, the case being partly in section, on the line 6 6 in that figure. Fig. 7 is a vertical transverse mid-section of another form of telephone removed from its case, the section being cut along the line 7 7 in Fig. 8. Fig. 8 is a front elevation of the same, partly broken away; and Fig. 9 is a section answering to Fig. 7, and showing a slightly different construction. Fig. 10 is a front elevation of another form, partly broken away. Fig. 11 is a side elevation thereof. Fig. 12 is a front elevation of a slightly different construction. Fig. 13 shows, in front elevation, another modification. Fig. 14 is a side elevation thereof; and Figs. 15, 16, and 17 are views showing further modifications.

In all the views the following letters refer to the parts named wherever those parts occur.

A designates the inclosing-case as a whole; B, the mouth-piece thereof or sound-opening therein; C, the diaphragm or acoustic vibrator as a whole; D D, the resistance-varying contacts or electrodes, and E the non-vibratory connections as a whole between the case and the active elements of the telephone which are inclosed therein. These parts are all fully described in my said patent.

Referring to Figs. 1 to 4, $a$ is a horizontally-arranged wire or rod, supported at its ends and forming a pintle for hinges $b$ $b$, the opposite leaves of which are fixed to the tops of two flat plates, $c$ $c$, which depend therefrom. To each of the plates $c$ $c$ is connected a symmetrical plate, $d$, through the medium of a ring, $e$. The parts $c$, $d$, and $e$ are all of thin, light, resonant wood, and together constitute the acoustic vibrator C. The plate $d$ is shown in disk form, of greater diameter than the lower portion of the plate $c$. The plate $c$ has a sound-opening, $f$, cut through it, and through this opening projects one of the electrodes D, which is fixed to the plate $d$, being confined in a metal cup, which is clamped to the plate by a screw and nut, as shown, or fastened in any other suitable manner. The two electrodes D D approach and touch each other, being pressed gently or lightly together by the tendency of the two opposed acoustic vibrators C C, to assume a position with their centers of gravity directly beneath the point of suspension $a$, they being, by the extent of projection of the electrodes, separated slightly beyond such position. The electrode D, opening $f$, ring $e$, and disk $d$ are all concentric, or approximately so. The electrodes are respectively in connection with wires $g$ and $h$ of the local circuit, one of which leads to one pole of the battery and the other to the primary coil of the inductorium, which connects thence with the other pole of the battery, as is common. The ends of the rod $a$ are held in cushions $i$ $i$, of felt, rubber, or other non-vibratory substance, which cushions are confined in recesses in the case A. Weights $j$ $j$ are hung on the rod $a$, being separated from the case A and the vibrator C by washers $k$ $k$, of felt or rubber. These cushions are the "elastic connections," and these weights the "inert body" referred to in my said previous patent.

The sound-opening B is a circular hole through the case A, of about the diameter of the ring $e$, and has fixed to it a molding, $m$, with cylindrical inner surface, which molding answers to the "sound-confining walls" in Figs.

5 and 6 of my said patent. A guard, consisting of a sheet of wire-cloth or wire-gauze, or a grating of slender metallic rods, is placed over the opening B, to partially conceal the interior parts and to exclude the fingers of meddlesome persons, which might otherwise injure said parts. This guard does not perceptibly affect the transmitting properties of the telephone.

This telephone differs in several respects from that shown in my previous patent, and by virtue of these differences its action is more perfect and uniform.

It will be observed that there are two acoustic vibrators, each bearing one elec'rode, instead of but one vibrator bearing one electrode, with the other electrode suspended by a metallic arm, as in my previous telephone. By providing a mouth-piece opposite each vibator, as shown, the speaker may be on either side of the instrument indifferently. Thus the telephone may be set on a double desk and be used by either occupant thereof, or it may be set in the wall between two rooms or offices, and be used by persons in either room. This capacity renders it possible in many instances to use but one telephone where otherwise two would be required. Another and more important result accrues from this construction. In all battery-transmitters the resistance-variations are due to differences of pressure between the electrodes. The front electrode, fixed to the diaphragm, vibrates backward and forward against the back electrode. As it moves backward the back electrode resists its motion, and to the extent of this resistance the electrical contact of one with the other is made more intimate. On the return or forward motion of the front electrode the rear electrode follows it to a greater or less extent and at a less speed, so that their contact is rendered lighter or less intimate.

In my previous telephone the rear electrode, being suspended from above and pressed by gravity against the front one, resists the backward excursion of the front electrode, by virtue of the joint action of two forces, its forward tendency in seeking a position of equilibrium, and its inertia. The backward impulse of the forward electrode is thus resisted uniformly, whatever be the extent or energy of the vibration. The result of this uniform resistance I have found to be that sounds of different volume are not all transmitted with the same clearness and accuracy. Thus speech in a quiet tone of voice is faithfully transmitted; but loud or close talking or shouting is rendered hoarse or rough, or at least "barrel-like," at the receiver. This is because of the inability of a rear electrode so mounted, which is adjusted for sensitiveness to low or quiet sounds, the vibrations of which sounds are short and even, to respond to loud sounds, the vibrations of which are more ample and energetic. The backward impulse of the front electrode is in such case so violent that the rear electrode is thrown so far back that when the front electrode commences its return movement, under the influence of the acoustic vibrator to which it is attached, the rear electrode, having only its forward tendency by virtue of gravity to induce it to return, moves forward so sluggishly that the contact between the two is unduly decreased, if not, as in cases of extreme vibration, entirely broken. To remedy this I now provide the rear electrode with an additional tendency to vibrate in conformity with the forward electrode. I fix it to a broad, light, wing-like body, which gives it a hold upon the air, that it may be affected by a passing sound-wave, as well as the front electrode. A sheet of mica or thin metal will serve this purpose, as shown in the sections Figs. 15 and 17, where the rear electrode (the left-hand one) is shown as suspended by a light metallic arm, $n$, as in my previous application; but I prefer to provide the rear electrode with an acoustic vibrator the same in all essential respects as that to which the front electrode is fixed, that both may be vibrated by the same sound-wave. This construction does not, as might be supposed, cause both electrodes to vibrate so equally and simultaneously that their electrical contact remains invariable; but it greatly increases the range of the instrument for the accurate transmission of sounds of different strength. The practical result is that both very soft and very loud sounds are transmitted with equal truth and purity.

In Figs. 13 and 14 is shown the simplest construction embodying this feature of my invention.

The acoustic vibrators C C are of the character shown in my previous application, being rectangular flat plates, both suspended from the same axis. I have devised a different construction of acoustic vibrator or diaphragm from that shown in my previous patent, in order to more effectually suppress the fundamental or natural tone of the vibrator and render it equally responsive to tone of any pitch. In my said patent the vibrator, being confined to an axis at its upper edge, is not wholly free to vibrate; or, in other words, it is more free to vibrate at its free lower portion than at its confined upper portion. Its vibration is hence unequal, and it tends to vibrate with one uniform tone or pitch, so that it responds somewhat more loudly to sounds of that pitch than to others. This tendency is to a great extent suppressed in my previous construction by affixing light rims or partitions to the vibrator. I now accomplish this result more effectually without burdening the vibrator by any such attachments. I form the vibrator of two plates, $c$ and $d$, arranged close to each other, but leaving a thin air-space between them. The plate $d$ is supported by the plate $c$, being connected thereto symmetrically around or on opposite sides of the electrode. Thus the plate $d$ is capable of vibrating uniformly in all its portions. The connection between the two plates is preferably an annular one, as shown in Figs. 1 to 4 and 7 to 9; but it may be by means of opposite straight strips, as shown in Fig. 10, or by a series of points or posts, as shown in Fig. 12. It is preferably located about midway between the center and the perimeter of the plate $d$, as shown in Figs. 1 to 4, and 10, 12, and 15; but it may be placed at the center, as shown in Figs. 5 and 6, or at the periphery, as shown in Figs. 7, 8, and 9. The adjacent plates, $c$ and $d$, being of somewhat different pitch, as will naturally happen, modify each other's vibration, and the resultant is a compound plate which has no special tendency to respond to any one pitch more than to another. The confined layer of air also exerts an influence in suppressing superfluous vibrations. I prefer that the plate $c$ be provided with the sound-opening $f$, in order that this layer of air may have free communication with the external air; but it may be closed up so as to entirely inclose the air, as shown in Fig. 9. The plate $c$, being confined at its upper edge, vibrates more freely at its lower edge, and hence its vibration is less perfect than that of the symmetrically-supported plate $d$. On this account I prefer to affix the electrodes D D to the plates $d\ d$, as I have secured the best results by this construction. They may, however, be affixed to the plates $c\ c$, as shown in Fig. 9, or opposite the connections $e\ e$, as shown in Figs. 5 and 6.

The plates $c$ and $d$ may be of almost any shape, provided their symmetrical proportions are preserved or approximated to. In Figs. 2 and 6 the plate $d$ is circular, in Fig. 10 it is square, and in Fig. 12 it is octagonal.

Another feature of my present invention consists in crossing the grain of the wood of adjacent plates, as indicated by the shading in the several figures. In Fig. 13 the grain runs diagonally, in all the other figures it runs vertically and horizontally. The slightly-diverse vibration in the two plates due to the difference in the direction of the grain is also somewhat instrumental in suppressing any tendency to vibrate in any one pitch.

Figs. 5 and 6 show a construction differing from that shown in Figs. 1 to 4 only in the form of the elastic support $i$, which consists of rubber suspending-rings, as in my previous patent; in the connection of the plates $c$ and $d$, the part $e$ being a central disk or washer; in the size of the sound-opening B, whose diameter, owing to the construction of the vibrator C, is made nearly equal to that of the disk $d$; and in the construction of the case A. The latter is not material to my invention.

Any suitable form of case may be used to inclose the essential parts of the telephone; but the latter will operate as well when suspended in the open air. In my previous patent I have shown a case lined with muffling material to prevent reverberation. I now secure the same result by making the case to fit closely around the vibrators, as best exemplified in the construction shown in Figs. 1 to 4, and by providing an opening at both front and back, so that there is little opportunity for reverberation.

Fig. 16 shows a possible modification of my construction of the vibrators C. Slender metal arms or rods $n\ n$ are substituted for the plates $c\ c$, by which the electrodes are suspended from the axis $a$. To the electrodes are centrally fixed the disks $d\ d$, as in Figs. 5 and 6. The advantages of providing each electrode with a vibrator, and of supporting the plate $d$ symmetrically around the electrode, that it may vibrate on all sides thereof equally, are here retained, but the modifying influence of the plate $c$ on the plate $d$ is lost. If arranged closely enough together, the two plates $d\ d$ will exert a similar influence on each other.

The suspended rear electrode, D, with its wing-like support, may be employed, in connection with the ordinary peripherally-confined diaphragm, with good effect, as shown in Fig. 17, which is a vertical mid-section.

Many of the modifications referred to in my previous patent are equally applicable to my present invention.

I make no claim to arranging the electrodes or resistance-varying device between two diaphragms, as I am aware that such has been done when the ordinary peripherally-confined iron diaphragm has been employed.

I claim as my invention—

1. In a transmitting-telephone, the combination, with an acoustic vibrator or diaphragm bearing the front resistance-varying electrode, of the rear electrode consisting of a contact-button freely hung or suspended in such manner that it is pressed by the force of gravity lightly against the front electrode, and provided with a light thin wing-like plate of extensive surface and of vibratory or resonant material to which it is fixed, and by which it is given a hold upon the air, substantially as set forth.

2. A transmitting telephone consisting of the combination of an acoustic vibrator, flexibly mounted or suspended from one edge, so as to be free to move bodily to and fro, a resistance-varying electrode fixed thereto, a second such electrode similarly mounted or suspended and pressed lightly against the first by the force of gravity, and a light wing-like plate fixed to said second electrode, and serving to give it an extended hold upon the air, substantially as set forth.

3. A transmitting-telephone consisting of two freely mounted or suspended acoustic vibrators, consisting of vibrating plates of resonant material, each bearing a resistance-varying electrode, and hung in such manner as to lightly press the two electrodes together by the force of gravity, substantially as set forth.

4. A transmitting-telephone consisting of two like acoustic vibrators, C C, consisting of vibrating plates of resonant material suspended from the same axis $a$, and bearing between them the resistance-varying electrodes D D, combined and operating substantially as set forth.

5. The combination of case A, having sound-openings or mouth-pieces B B at opposite sides, two acoustic vibrators, C C, freely hung therein, so as to be capable of moving bodily toward and from either opening, and the resistance-varying electrodes D D, borne by said vibrators and pressed thereby lightly together, substantially as and for the purposes set forth.

6. In a transmitting-telephone, the combination of two adjacent and approximately parallel vibrating plates of thin resonant wood, whose grains are arranged to cross each other, the said plates being separated by a layer of air, substantially as set forth.

7. An acoustic vibrator or diaphragm for a telephone, consisting of a part which depends through the action of gravity from a support above and is capable of pendulous movement, and a vibrating plate mounted thereon through the medium of one or more supports or connections arranged symmetrically to its area, substantially as set forth.

8. An acoustic vibrator or diaphragm for a telephone, consisting of a vibrating plate which is supported freely at one edge or portion, in combination with another adjacent vibrating plate mounted on it through the medium of symmetrically-disposed connections or supports, whereby a layer of air is confined between the two, substantially as set forth.

9. An acoustic vibrator or diaphragm for a telephone, consisting of a vibrating plate supported freely at one edge or portion, in combination with a second vibrating plate mounted on the first through the medium of connections or supports arranged inside of the edges of the said second plate, whereby said edges are rendered free to vibrate, substantially as set forth.

10. An acoustic vibrator or diaphragm for a telephone, consisting of the combination of two adjacent and substantially parallel vibrating plates connected together by an annular support arranged concentrically with one of said plates, and the other plate freely supported at its edge or portion remote from said connection, substantially as set forth.

11. An acoustic vibrator or diaphragm for a telephone, consisting of a suspended vibrating plate, in combination with another adjacent vibrating plate borne by the first through the medium of an annular support, whereby a layer of air is inclosed between said plates and the annular support, and with a central sound-opening through one of said plates, substantially as set forth.

12. An acoustic vibrator for a transmitting-telephone, consisting of a suspended vibrating plate provided with an opening, in combination with a second vibrating plate arranged concentrically with said opening, bearing an electrode which projects through said opening and borne by the first plate through the medium of a support or supports disposed symmetrically around said opening, substantially as set forth.

13. An acoustic vibrator or diaphragm for a transmitting-telephone, consisting of a suspended vibrating plate, $c$, having a sound-opening, $f$, in combination with an adjacent vibrating plate, $d$, mounted on the first through the medium of an annular connection, $e$, and bearing an electrode, D, which projects through the opening $f$, substantially as set forth.

14. A transmitting-telephone consisting of the combination of plates $c\ c$, suspended from axis $a$, plates $d\ d$, borne by said plates $c\ c$, and electrodes D D, borne by said plates $d\ d$, substantially as set forth.

In witness whereof I have hereunto signed my name in the presence of two subscribing witnesses.

WILLIAM MAIN.

Witnesses:
ARTHUR C. FRASER,
HENRY CONNETT.